US009652772B1

(12) United States Patent
Eyges et al.

(10) Patent No.: US 9,652,772 B1
(45) Date of Patent: May 16, 2017

(54) SYSTEMS AND METHODS FOR FRAUD DETECTION

(75) Inventors: Vitaly Eyges, Santa Clara, CA (US); Kevin King, Johns Creek, GA (US)

(73) Assignee: JPMorgan Chase Bank, N.A., New York, NY (US)

( * ) Notice: Subject to any disclaimer, the term of this patent is extended or adjusted under 35 U.S.C. 154(b) by 190 days.

(21) Appl. No.: 13/545,487

(22) Filed: Jul. 10, 2012

Related U.S. Application Data

(60) Provisional application No. 61/522,071, filed on Aug. 10, 2011.

(51) Int. Cl.
*G06Q 20/40* (2012.01)
(52) U.S. Cl.
CPC .................... *G06Q 20/4016* (2013.01)
(58) Field of Classification Search
CPC .................................. G06Q 20/4016
USPC .............................. 705/30, 43, 37
See application file for complete search history.

(56) References Cited

U.S. PATENT DOCUMENTS

| 2010/0169192 A1* | 7/2010 | Zoldi | G06Q 40/12 705/30 |
| 2011/0307382 A1* | 12/2011 | Siegel et al. | 705/44 |
| 2013/0024375 A1* | 1/2013 | Choudhuri et al. | 705/44 |

* cited by examiner

*Primary Examiner* — Jagdish Patel
(74) *Attorney, Agent, or Firm* — Hunton & Williams LLP

(57) ABSTRACT

The invention provides systems and methods for identifying fraud in an ATM transaction and in other financial processing environments. The system, tangibly embodied in the form of a computer processer includes a profile database, a filter processing portion, a scoring engine, and an authorization processing portion. The profile database contains card profiles and ATM profiles. The filter processing portion inputs transaction data generated from a requested ATM transaction. The filter processing portion includes a plurality of filters that filter high risk transactions, and outputs customer related data and ATM related data to the profile database. The scoring engine assesses risk of the high risk transaction based on attributes of the transaction, data in at least one card profile, and data in at least one ATM profile. The authorization processing portion determines whether the requested transaction should be approved or declined based on the fraud score and transaction data.

18 Claims, 13 Drawing Sheets

SYSTEMS AND METHODS FOR FRAUD DETECTION

RELATED APPLICATION

This application claims priority to U.S. Provisional Patent Application 61/522,071 filed Aug. 10, 2011, the content of which is incorporated herein by reference in its entirety.

BACKGROUND OF THE INVENTION

ATMs (automated teller machines) are common in today's financial infrastructure. Typically, a customer utilizes an ATM to withdraw funds from his or her bank account, deposit funds into her account, or secure information regarding the status of her account, for example. The customer inserts her card into the ATM, and the ATM reads the card so as to secure information from the card. The ATM then communicates with the customer's bank so as to authorize and perform the requested action.

ATM use is susceptible, in some situations, to fraud. For example, a fraudster may install a device upon the ATM so as to read a customer's magnetic stripe off the customer's credit card. Further, a fraudster may install a video camera so as to observe the customer's PIN code. As a result, the fraudster will then be in possession of key pieces of information, which may then be used to perform fraudulent transactions. In particular, the fraudster may then be able to manufacture a credit card that is operationally identical to the original customer's credit card. In withdrawing cash, the fraudster may only be limited by the daily limit associated with the account. The fraudulent use may continue until either the customer or the bank identifies the fraud and takes measures to stop it.

Current practices to identify and prevent ATM fraud are deficient allowing substantial loss. Fraud is being performed against hundreds of cards a day. The systems and methods of the invention address these deficiencies of known techniques.

BRIEF SUMMARY OF THE INVENTION

The invention provides systems and methods for identifying fraud in an automated teller machine (ATM) transaction and in other financial processing environments. The system is tangibly embodied in the form of a computer processer, the system comprising a profile database, a filter processing portion, a scoring engine, and an authorization processing portion. The profile database contains both card profiles in a card profile database; and ATM profiles in an ATM profile database. The filter processing portion inputs transaction data generated from a requested ATM transaction by a customer, the filter processing portion including a plurality of filters that filter high risk transactions so as to identify that the transaction by the customer is a high risk transaction, and the filter processing portion outputting customer related data and ATM related data to the profile database. The scoring engine assesses risk of the high risk transaction based on (1) attributes of the transaction, data in at least one card profile, and (2) data in at least one ATM profile, and the assessing risk by the scoring engine being represented by a fraud score generated by the scoring engine. The authorization processing portion determines whether the requested transaction should be approved or declined, the authorization processing portion inputting the fraud score from the scoring engine, the authorization processing portion using the fraud score, in conjunction with the transaction data generated from the requested ATM transaction, in its determination of whether the requested transaction should be approved or declined.

BRIEF DESCRIPTION OF THE DRAWINGS

The present invention can be more fully understood by reading the following detailed description together with the accompanying drawings, in which like reference indicators are used to designate like elements, and in which.

DETAILED DESCRIPTION OF THE INVENTION

Figure 1:
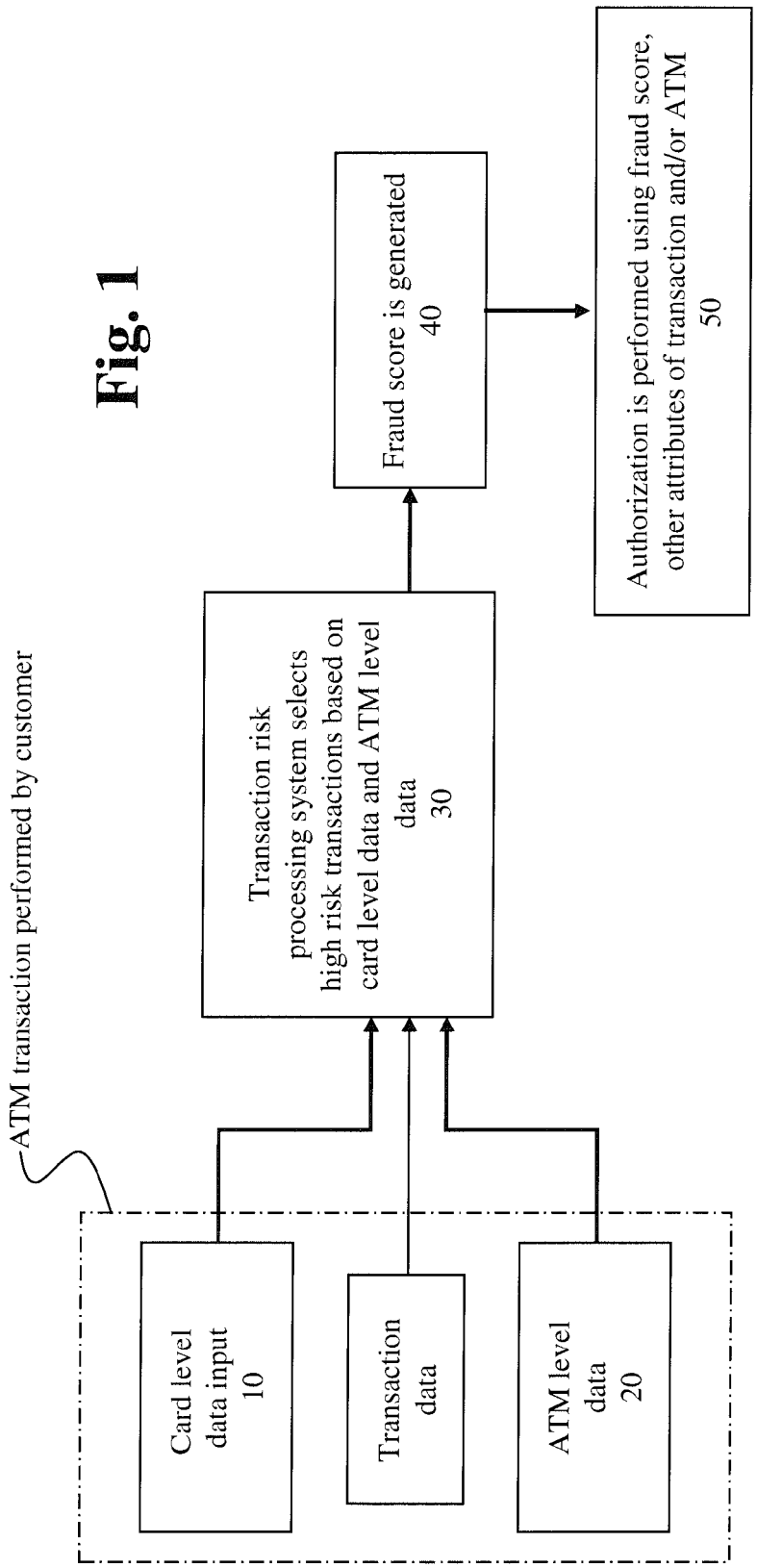
FIG. 1 is a high level flowchart showing processing of the invention in accordance with one embodiment of the invention.

Hereinafter, aspects of a transaction risk processing system in accordance with various embodiments of the invention will be described. As used herein, any term in the singular may be interpreted to be in the plural, and alternatively, any term in the plural may be interpreted to be in the singular.

The invention provides systems and methods to minimize and prevent ATM fraud, as well as other transaction related fraud. In particular, the invention deals with the reality that while there are hundreds of fraudulent transactions on any given day, such fraudulent transactions are a small percentage of the legitimate transactions performed every day. Accordingly, it becomes important to differentiate, identify and prevent fraudulent transactions while allowing legitimate transactions to be performed with as little hindrance as possible.

Accordingly, the invention provides a tool, i.e., a framework, to detect in real time fraudulent transactions, without affecting too many legitimate transactions. In particular, the invention provides for the collective processing of customer profiles with ATM profiles to identify fraud.

In a typical situation, the fraudster tries to take the cards he has acquired and cash out those cards as quickly as possible. The fraudster may try to do several cards at a time, i.e., at one ATM. The fraudster may then move on to a further ATM. The invention provides methodology to identify this multi-card pattern (as well as other patterns and attributes of fraud), as quickly as possible, when it is starting to develop. The invention effectively utilizes both (1) a customer profile, and (2) an ATM machine profile. Accordingly, the invention can identify when the ATM machine itself is at risk of fraud, as well as when a particular customer is at risk of fraud. The invention might identify that the customer is at risk because multiple transactions have been performed on the customer's card, which is not normal for that card. The invention might identify that an ATM is at risk because an excessive number of transactions have been performed at the machine by customers who do not normally use the machine, or when activity and usage patterns of a machine are no longer normal for that particular machine. As a result, the invention effectively utilizes multiple variables, coming together, so as to identify fraud for both the ATM and the customer. In accordance with one embodiment, the invention utilizes such variables in a predictive "rules" based approach.

In further explanation, the profile information is used to calculate fraud likelihood for ATM transactions in real time. For example, if an abnormal transaction is being performed by a customer, who's profile indicates a lot of abnormal (but legitimate) transactions in the past, at an ATM, which profile indicates that abnormal (but legitimate) transactions have frequently occurred there, then the estimated fraud likelihood is low. On the opposite, for a customer who has rarely deviated from a regular ATM usage pattern in the past, an abnormal transaction should be regarded as having an elevated risk of fraud. As a result, the invention effectively utilizes historic profile information along with multiple other variables to calculate the risk of ATM fraud in real time. In accordance with one embodiment, the invention utilizes such parameters in a predictive "rules" based approach.

In combination, or in accordance with an alternative embodiment, the invention may utilize a dynamic score-based approach. The invention may list, rank and appropriately weight transactions (both at the customer level and the ATM level) so as to identify fraudulent transactions. A probability score (i.e., a confidence score) is created, based on the "multiple variables" available. That score is then used to prioritize questionable transactions (so as to work from top down) so as to assess the legitimacy of such transactions. A threshold fraud score may be established that will be compared to the fraud score assigned to a particular transaction. For example, if the fraud score for the customer transaction is below the threshold, then the transaction will be approved. On the other hand, if the fraud score for the customer transaction is above the threshold, then the transaction will be denied and/or further confirmation of the legitimacy of the transaction will be required, prior to authorizing.

Further, the invention may include interacting with the customer at the ATM. For example, a transaction may be identified as a high risk transaction, and such assessment conveyed to the customer either through the interface of the ATM or through some other medication channel. The customer might be requested to confirm her home zip, or in some other manner confirm her identity, and that the legitimate customer is requesting the transaction. This checking may then be tied to the initial transaction fraud score. That is, the results of the interaction with the customer at the ATM may adjust and/or be factored into the fraud score for the transaction.

Further, the invention provides for biometrics to be used. For example, facial recognition parameters may be utilized. For example, fraud will be identified if the same person (as identified by facial recognition) utilizes cards of different customers in succession. Other types of secondary authentication may also be utilized, such as the system interfacing with the customer's cell phone to provide secondary authentication. Questions might be posed to the customer at the machine, so as to confirm identity, e.g. is this your vacation getaway picture that you previously entered. Pace and velocity of transactions may also be utilized. Commonalities of cards used in sequence may be utilized—intra day and next day. The processing of the invention may be extended from ATM use to merchant POS use and online use, for example. Rolling profiles may be utilized, e.g. dynamic ATM profiling, that is updated in some periodic manner or based on real-time data being input into the particular database. A rolling profile may be utilized in a particular database and/or for a particular parameters. Such rolling profile is constituted by a first in first out (FIFO) methodology in which the oldest data is expunged from (pushed out of) the database as new data is added in to the particular database. Such rolling profile may be particularly helpful in identifying fraud in a situation in which the proximity of events are analyzed. It is appreciated that the periodic time in which the data is rolled will depend on the nature of the particular data being analyzed, and the particular fraud activity that the analysis is targeted at, as well as other parameters. Accordingly, the particular time period in which the data is rolled may be varied as desired, as well as the particular volume of data may be varied as desired. In general, it is appreciated that a dynamic database may be provided with quicker rollover vis-à-vis a static database.

Accordingly, the invention provides for the capability to use multiple variables, such as multiple customer profiles and at least one ATM profile, collectively, so as to identify fraud in a highly predictive manner. Such variables may be collectively utilized in a rule based system and/or in a dynamic score based system. Various other features are provided.

FIG. 1 is a high level flowchart showing processing of the invention in accordance with one embodiment of the invention. The processing is initiated by a customer performing a transaction at an ATM. In accordance with the invention, card level data is input (10) and ATM level data is input (20) in conjunction with inputting and processing of the transaction data itself.

The card level data, ATM level data, and transaction data are transmitted to a transaction risk processing system. The transaction risk processing system analyzes the data and selects those transactions which are deemed high risk (30). In particular, the determination of whether the transaction is high risk or not is performed utilizing both the card level data and the ATM level data. As a result of the processing performed by the transaction risk processing system, a fraud score is generated (40). As shown in FIG. 1, authorization processing is then performed (50) using the fraud score and other attributes of the transaction and/or attributes of the particular ATM at which the transaction was requested. Various further details of the systems and methods of the invention are described below.

Figure 2:
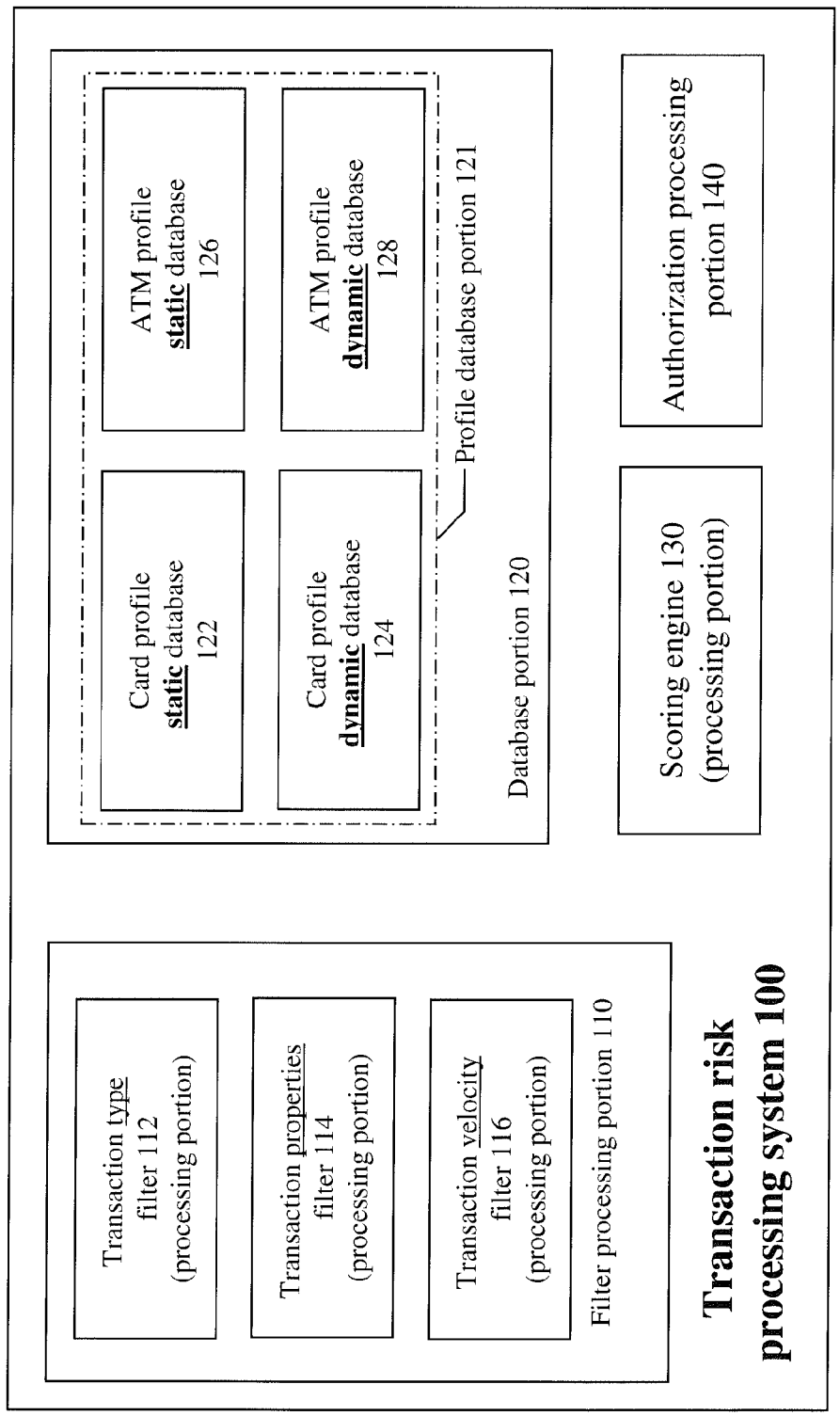
FIG. 2 is a block diagram showing a transaction risk processing system, in accordance with one embodiment of the invention.

FIG. 2 is a block diagram showing a transaction risk processing system 100, in accordance with one embodiment of the invention. As shown, the transaction risk processing system 100 includes a filter processing portion 110, a database portion 120, a scoring engine 130, and an authorization processing portion 140. Each of the filter processing portion 110, the scoring engine 130, and the authorization processing portion 140 may be in the form of a tangibly embodied computer processor. The database portion 120 may be in the form of a tangibly embodied computer readable medium.

The filter processing portion 110 includes a transaction type filter 112, a transaction properties filter 114, and a transaction velocity filter 116. Each of such filters may also be in the form of a tangibly embodied computer processor. In summary, the transaction type filter 112 filters out particular types of transactions. The transaction properties filter 114 filters transactions based on particular attributes of those transactions, including the ATM at which the transaction was requested. Further, the transaction velocity filter 116 filters out transactions based on the velocity of those transactions vis-à-vis other associated transactions. Such other associated transactions might be associated in terms of use of the same card, transaction requests by the same person, and/or transaction requests at the same ATM or in ATMs related to each other in some manner. For example, the ATMs might be related to each other in that they are in the same geographical region.

The database portion 120 includes a card profile static database 122, a card profile dynamic database 124, an ATM profile static database 126, and an ATM profile dynamic database 128. Each of the databases (122, 124, 126, 28) will be described in detail below.

A "dynamic database" as described herein means a database that is updated in real time. On the other hand, a "static database" is a database that is updated in some periodic manner using batch processing, for example. For example, a static database might be updated daily, weekly, monthly, or in some other periodic manner. A "dynamic database" may be updated in real time—meaning that processing is effected, in conjunction with the occurrence of an event, to output data representative of such event to the particular dynamic database.

Figure 3:
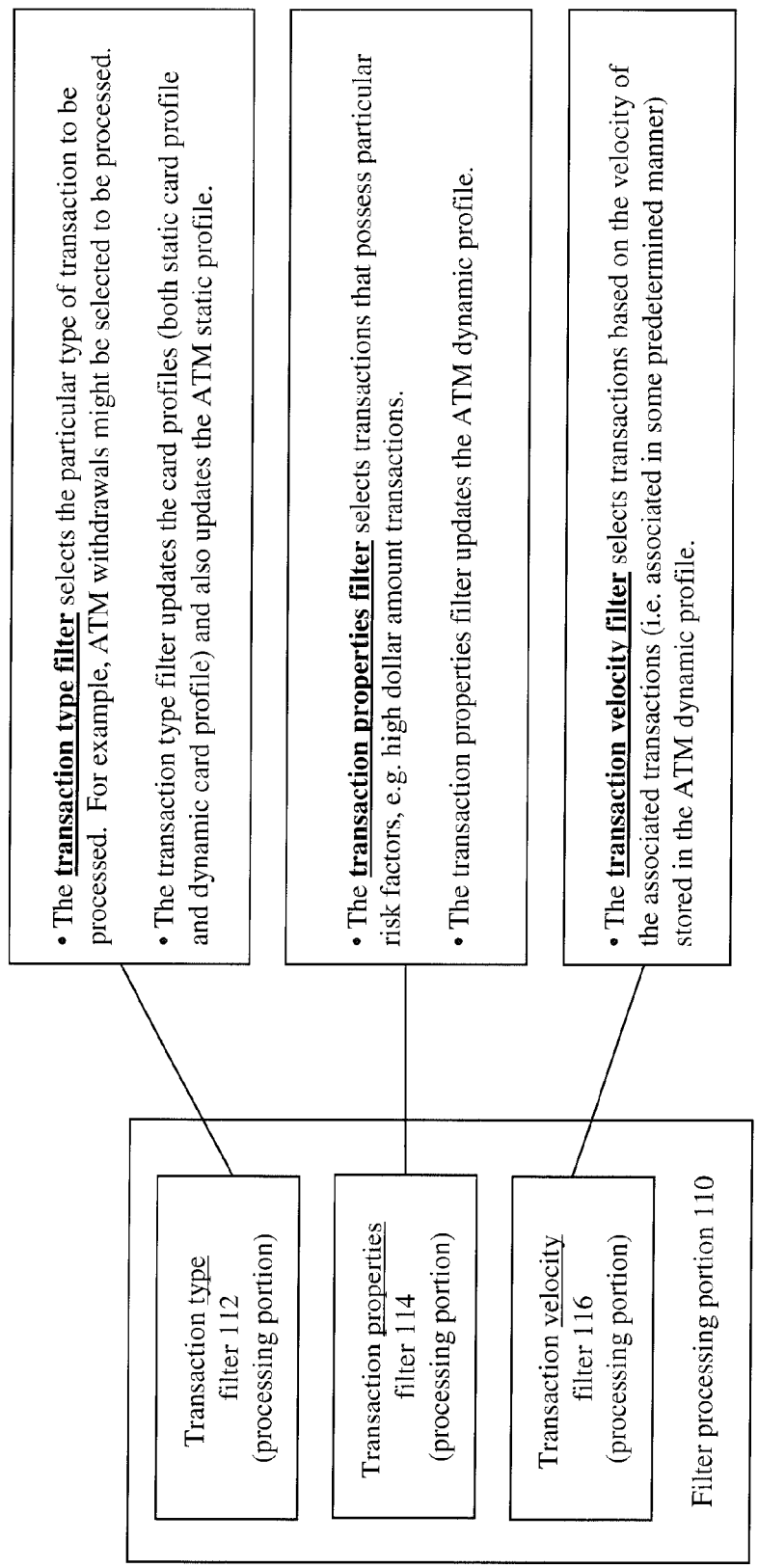
FIG. 3 is a block diagram showing further details of the filter processing portion, in accordance with one embodiment of the invention.

FIG. 3 is a block diagram showing further details the filter processing portion 110, in accordance with one embodiment of the invention. As described above, the filter processing portion 110 includes filters (112, 114, 116).

As described above, the transaction type filter 112 filters out particular types of transactions. In other words, the transaction type filter selects the particular type of transaction to be filtered out and thus further processed by the transaction risk processing system 100. In the example of FIG. 3, ATM withdrawals may be selected to be filtered out and thus further processed. However, it is appreciated that the filter 112 might be utilized to filter out other types of transactions. For example, features of the invention are applicable also to point-of-sale (POS) transactions. Accordingly, the filter 112 may be provided with the functionality to filter out POS transactions with certain attributes.

In addition to performing a filtering function, the transaction type filter 112 also updates databases in the database portion 120. Specifically, in accordance with one embodiment of the invention, the transaction type filter updates the card profiles (both static card profile and dynamic card profile) and also updates the ATM static profile.

FIG. 3 also illustrates the transaction properties filter 114. The transaction properties filter 114 filters transactions based on particular attributes of those transactions as well as attributes of the ATM at which those transactions were requested. In accordance with one embodiment of the invention, the transaction properties filter 114 is directed to filtering transactions based on particular attributes of the transaction itself. The transaction properties filter selects transactions that possess particular risk factors, such as transactions with a high dollar amount. However, it is appreciated that other attributes of a particular transaction may also be indicative of a high risk transaction. Accordingly, the transaction properties filter 114 may perform decisioning based on such other attributes, which may also be indicative of a high risk transaction.

In addition to performing a filtering function, the transaction properties filter 114 also updates at least one database in the database portion 120. Specifically, the transaction properties filter 114 updates the ATM dynamic profile in the database portion 120, in accordance with one embodiment of the invention. It is appreciated that the databases in the database portion 112 may be updated in some periodic manner as desired. For example, the databases might be updated weekly, updated daily, or updated in real time. Further, it is appreciated that certain types of data may be updated in the database portion 120 in a manner different from other types of data. For example, the database may be updated in real time for such data as a customer's use of a particular ATM at a single location or use at a group of ATMs in a particular geographical region. Such real-time updating may be needed in that it is such a pattern of use that the system 100 is designed to identify. On the other hand, historical use (such as the particular time of day that an ATM is commonly used) may not need to be updated in such a real time fashion. While such historical information may be used and provides valuable data, it may only be needed to update such information weekly or monthly, for example.

As shown in FIG. 3, the filter processing portion 110 also includes a transaction velocity filter 116. The transaction velocity filter selects a particular transaction for further analysis and review based on the velocity of that particular transaction vis-à-vis other associated transactions, i.e., that are stored in the ATM dynamic profile, for example. Such selection may be performed on some predetermined set of rules. Accordingly, in one aspect of the invention, the decisioning of the transaction properties filter 114 (in selecting a high risk transaction for further analysis) might be based on the attributes of the transaction itself. In contrast, in one aspect of the invention, the decisioning of the transaction velocity filter 116 might be more based on attributes of the relationship of a particular transaction vis-à-vis transactions that are associated with that particular transaction. For example, an associated transaction might be a transaction that is related to the particular transaction in that (1) the same ATM was used to perform the withdrawal, (2) the transaction was performed at the same general time at an ATM in geographical proximity, (3) the same person performed both transactions based on observed biometric features of the person, or (4) some other association.

Figure 4:
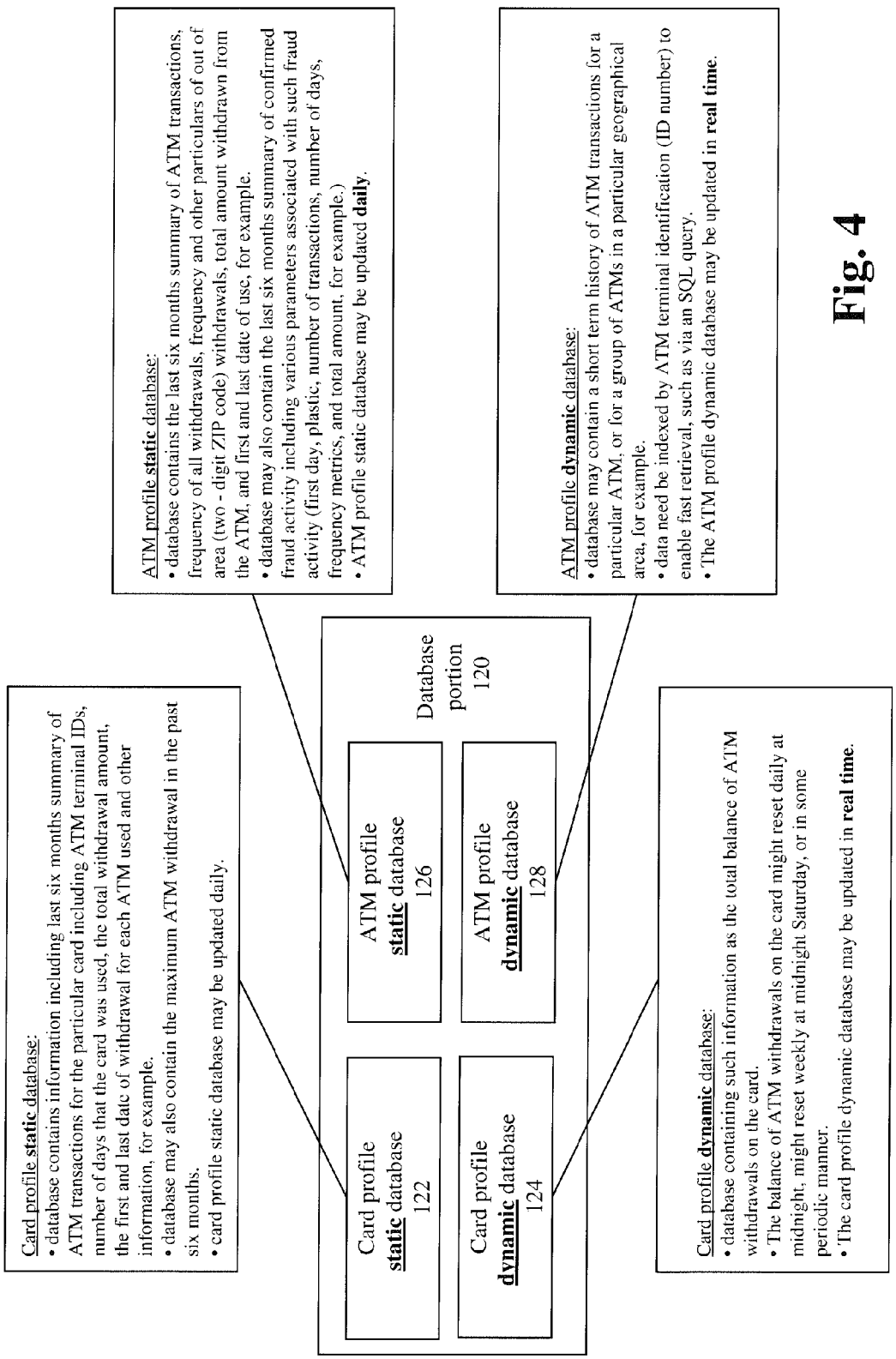
FIG. 4 is a diagram showing further details of the database portion, in accordance with one embodiment of the invention.

FIG. 4 is a diagram showing further details of the database portion 120, in accordance with one embodiment of the invention. As described above, the database portion 120 includes a card profile static database 122, a card profile dynamic database 124, an ATM profile static database 126, and an ATM profile dynamic database 128. Each of the databases may be disposed on a tangibly embodied computer medium.

The card profile static database 122 contains information for respective cards, such as for example respective credit cards. For example, the database might contain information including the last six months summary of ATM transactions for the particular card including ATM terminal identification (IDs), number of days that the card was used, the total withdrawal amount, the first and last date of withdrawal for each ATM used, and other information, for example. Other information that the card profile static database might includes is the maximum ATM withdrawal for that card in the last six months. In one embodiment, the card profile static database may be updated daily, for example.

The card profile dynamic database 124 contains such information as the total balance of ATM withdrawals on the card, for example. The balance of ATM withdrawals on the card might reset daily at midnight, or in some other periodic manner. For example, the recorded balance of ATM withdrawals on the card might reset weekly at midnight. Accordingly, the information stored in the card profile dynamic database may be utilized by the system 100 to impose essentially a maximum withdrawal amount on a card for a particular time period. In accordance with one embodiment of the invention, the card profile dynamic database may be updated in real time.

The ATM profile static database may contain various information organized in a manner to reflect the operation of a particular ATM. Accordingly, the databases 122, 124 are directed to monitoring metrics associated with respective cards. On the other hand, the databases 126, 128 are directed to monitoring metrics associated with respective ATMs. The ATM profile static database might contain the last six months summary of ATM transactions, frequency of all withdrawals at that particular ATM, frequency and other particulars of out of area (based on ZIP code, e.g.) withdrawals, total amount withdrawn from the ATM in a particular time period, and first and last date of use, for example. It is appreciated that various other metrics might be monitored and applied, using a particular rule set, to identify fraud. Relatedly, the database may also contain the last six months summary of confirmed fraud activity. For example, such data regarding particular fraud activity might include first day that fraud was identified, the particular type of card (plastic) that was used to effect the fraud, the number of transactions that were implicated with the fraud, the number of days over which the fraud continued, frequency metrics relating to the fraud, and the total amount involved in the fraud. In one embodiment, the ATM profile static database might be updated daily.

The ATM profile dynamic database may contain such information as a short term history of ATM transactions for a particular ATM and/or for a group of ATMs in a particular geographical area, for example. It is appreciated that the data may be structured in such a way so as to enable fast retrieval of such data. For example, data may be indexed by ATM terminal identification to enable fast retrieval of such data. For example, SQL query processing might be utilized to retrieve data in a rapid manner. The ATM profile dynamic database may be updated in real time.

In accordance with one aspect of the invention, it is appreciated that the databases in the database portion 120 may reflect past use history of the card in a manner so as to minimize inaccurate indications of fraudulent activity. For example, such history may reflect past usage of the card in specific venues, such as at casinos, racetracks and/or airports, for example. For example, in a casino venue, it may be the situation that a legitimate customer interfaces with a single ATM so as to withdraw the maximum daily amount from a number of that customer's cards. In processing such observed event, the system may take into account that the particular customer has in the past shown similar behavior, and that such past behavior was indeed legitimate. Accordingly, the system may compare the past legitimate behavior with the current observed behavior. Based on the similarity of such behaviors, the system may perform processing to come to the conclusion that the current observed behavior is legitimate also. Such processing may be performed based on a suitable set of rules, which take into account past behavior, in conjunction with particular parameters representative of the current observed behavior of the customer.

Figure 5:
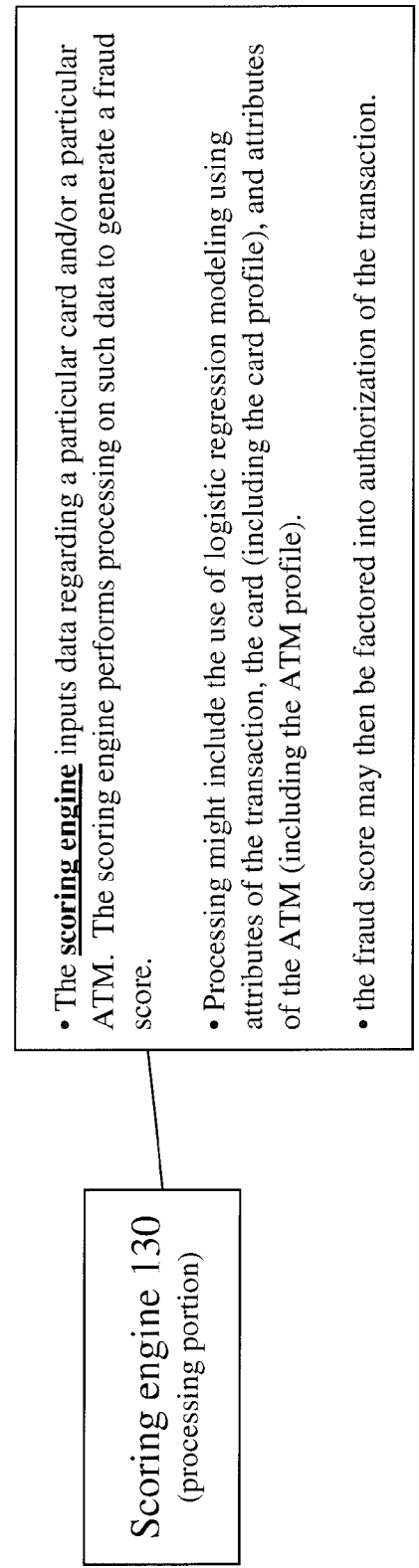
FIG. 5 is a block diagram showing details of the scoring engine, in accordance with one embodiment of the invention.

FIG. 5 is a block diagram showing details of the scoring engine 130, in accordance with one embodiment of the invention. In operation of the transaction risk processing system 100 the scoring engine 130 inputs data regarding a particular card and/or a particular ATM. The scoring engine performs processing on such data to generate a fraud score. The processing of the scoring engine 130 might include the use of logistic regression modeling using attributes of a particular transaction or transactions, attributes of the card (including the card profile) and attributes of the ATM (including the ATM profile), for example. In addition, or as an alternative to utilizing logistic regression modeling, the scoring engine 130 may utilize a linear rule set or some other type of rule set. For example, attributes of a transaction, a card, and/or an ATM may be input into a rule set. In decisioning based on the rule set, the rule set segregates transactions that are high risk. The fraud score that is generated by the scoring engine 130 may be factored into the authorization decisioning for a particular transaction. Various further details of the processing performed by the scoring engine 130 are described below.

Figure 6:
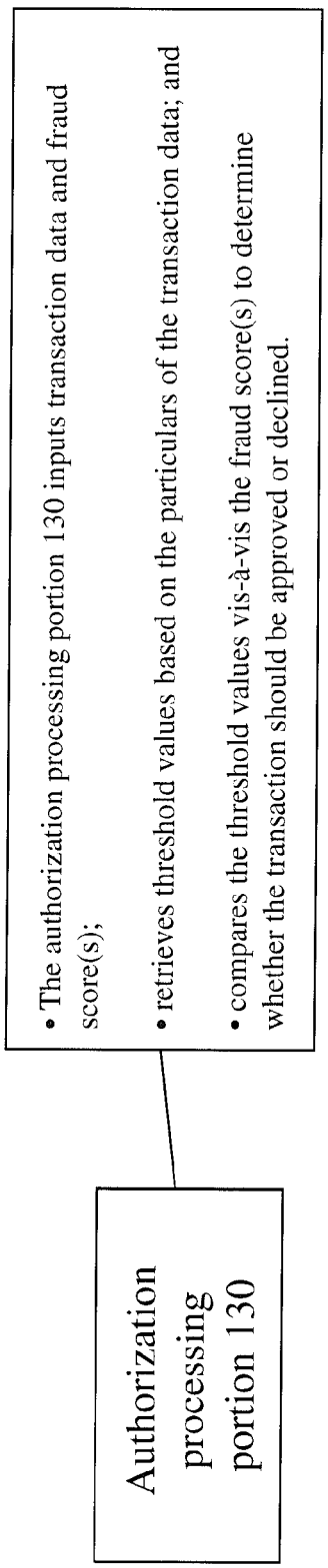
FIG. 6 is a diagram showing further details of processing performed by the authorization processing portion, in accordance with one embodiment of the invention.

FIG. 6 is a diagram showing further details of processing performed by the authorization processing portion 130, in accordance with one embodiment of the invention. As shown in FIG. 6, the authorization portion 130 inputs transaction data and at least one fraud score from the scoring engine 130. In an analysis of the transaction data, the authorization processing portion 130 retrieves threshold values based on the particulars of the transaction data, in accordance with one embodiment of the invention. It is appreciated that threshold values in one financial operating environment might be different vis-à-vis the threshold values in another financial operating environment. As shown, the authorization processing portion compares the threshold values vis-à-vis the fraud score(s) to determine whether the transaction should be approved or declined. Further details of such processing are described below.

Figure 7:
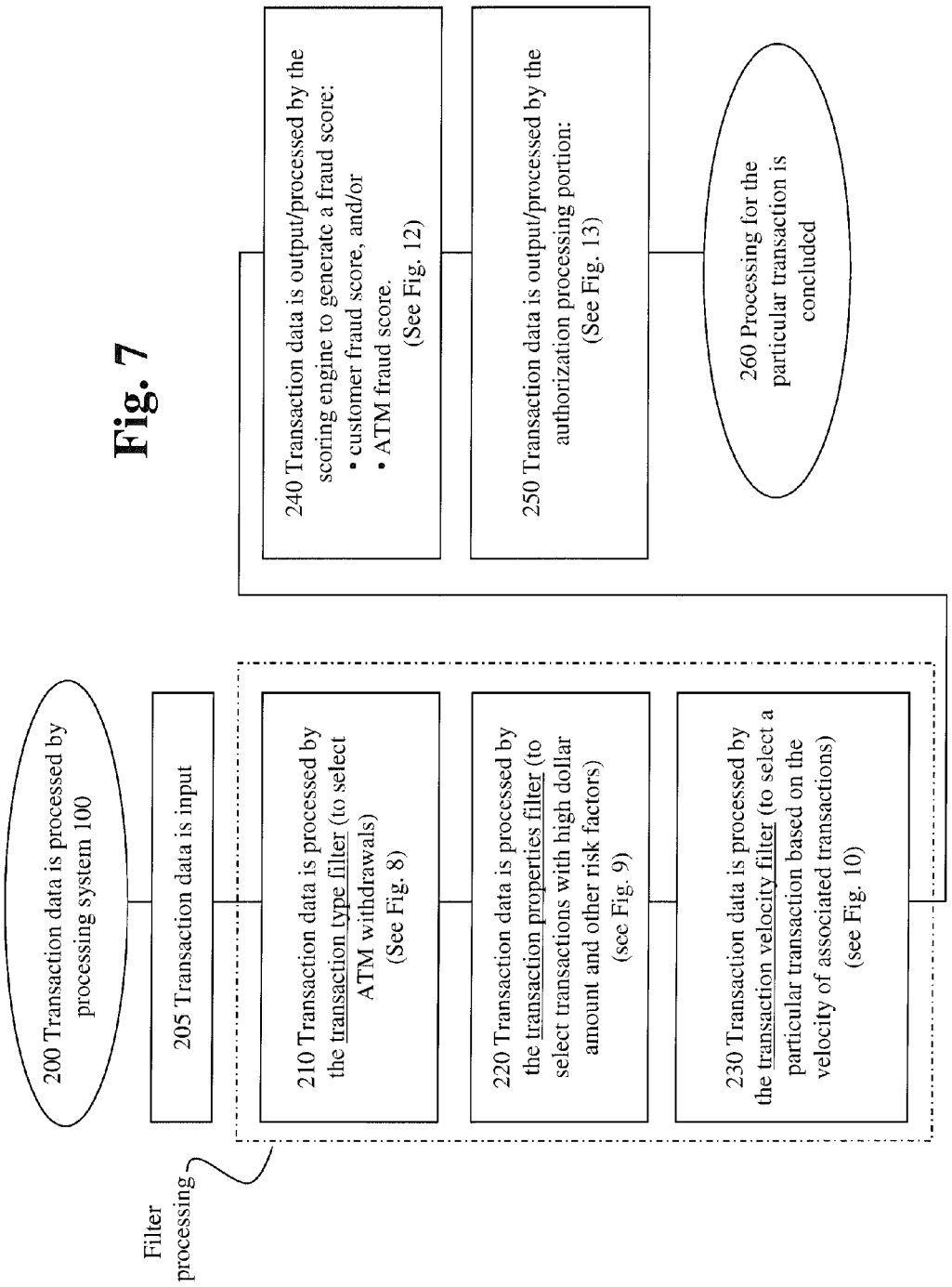
FIG. 7 is a high level flowchart showing processing of transaction data by the transaction risk processing system, in accordance with one embodiment of the invention.

FIG. 7 is a high level flowchart showing processing of transaction data by the transaction risk processing system 100, in accordance with one embodiment of the invention. As shown, the process starts in step 200 and passes to step 205. In step 205, transaction data (for a requested transaction) is input from an ATM machine via a communications network. After step 205, the process passes to step 210. In step 210, the transaction data is processed by the transaction type filter. In such processing, in this embodiment, the transaction type filter filters out transactions that are ATM withdrawals. Such withdrawal transactions are thus identified for further processing by the system 100. Further details of the processing by the transaction type filter step 210 are described below with reference to FIG. 8.

After step 210 of FIG. 7, the process passes to step 220. In step 220, transaction data is processed by the transaction properties filter. In such processing, the transactions are further filtered to select transactions with particular predetermined risk factors. For example, the transaction properties filter may be provided to select transactions with high dollar amount or other risk factors. Further details of the processing by the transaction properties filter step 220 are described below with reference to FIG. 9.

After step 220, the process passes to step 230 of FIG. 7. In step 230, the transaction data is processed by the transaction velocity filter. In such processing, in this embodiment, the transaction velocity filter selects transactions based on the velocity of a particular transaction vis-à-vis other transactions. Further details of the processing of step 230 in the transaction velocity filter are described below. After step 230, the process passes to step 240.

In step 240 of FIG. 7, the transaction data is output to and processed by the scoring engine. The processing by the scoring engine generates at least one fraud score. In particular, the scoring engine may generate a customer fraud score, a card fraud score and/or an ATM fraud score. The fraud score might be for a particular credit card, for example. Further details of the processing of step 240 are described below with reference to FIG. 12. After step 240, the process passes to step 250.

In step 250, the transaction data is output to and processed by the authorization processing portion 140. In such processing, the authorization processing portion 140 may approve or decline a requested transaction from a particular customer or using a particular card. Alternatively, or in addition, the authorization processing portion may vary options that are available to a particular customer or vary operations that are available at a particular ATM, for example. Further details of the processing of step 250 are described below with reference to FIG. 13.

After step 250, process passes to step 260. In step 260, processing for the particular transaction is concluded.

Figure 8:
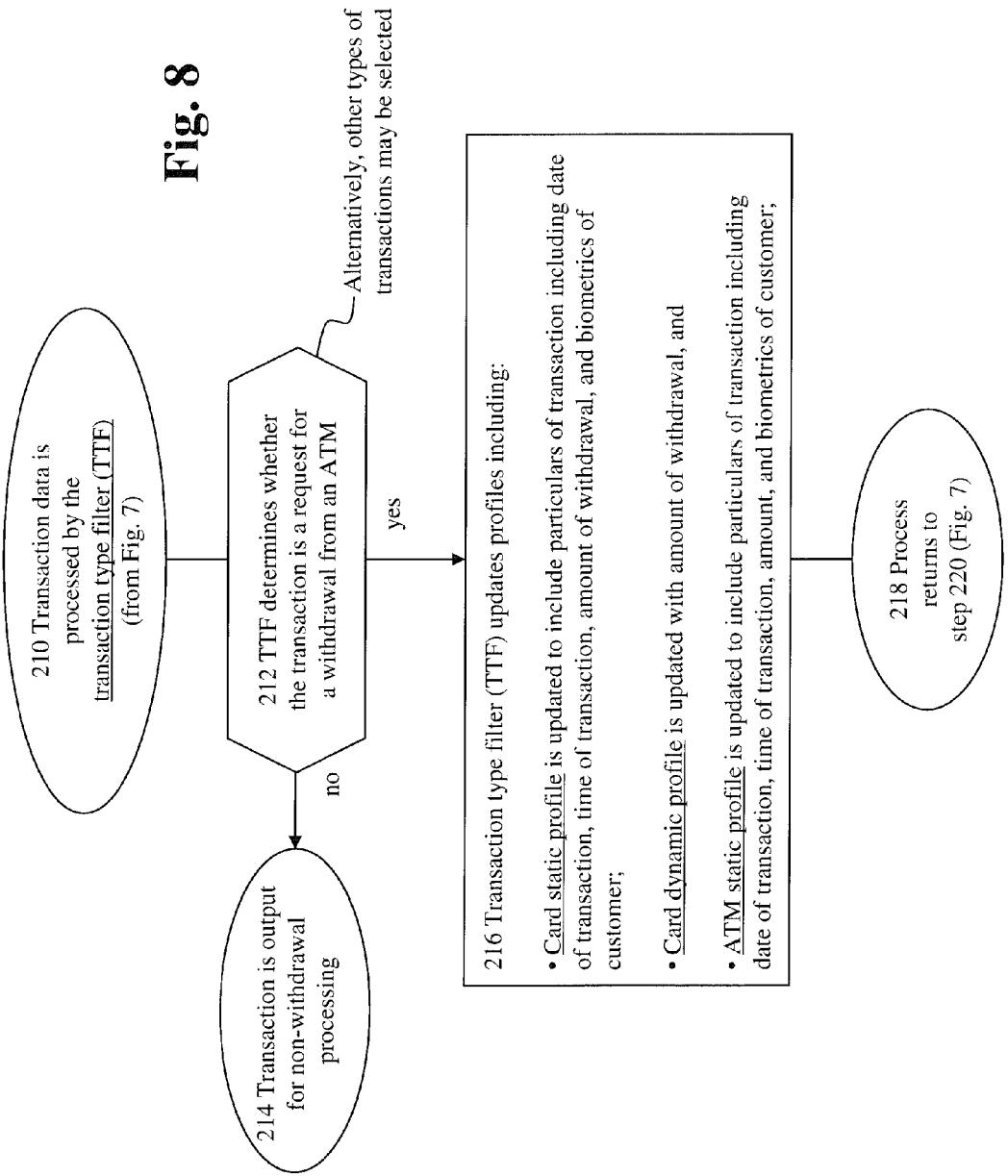
FIG. 8 is a flowchart showing further details of FIG. 7 in which the transaction data is processed by the transaction type filter, in accordance with one embodiment of the invention.

FIG. 8 is a flowchart showing further details of step 210 (FIG. 7) in which the transaction data is processed by the transaction type filter, in accordance with one embodiment of the invention. As shown, the sub-process of FIG. 8 starts in step 210 and passes to step 212. In step 212, the transaction type filter (TTF) determines whether the transaction is a request for a withdrawal from an ATM. Accordingly, the processing of step 212 of FIG. 8 filters out all ATM withdrawal transactions for further processing. However, in addition to—or as an alternative, it is also appreciated that various other types of transactions may be filtered out, i.e., selected for further processing. Accordingly, such filtered out transactions may be further assessed for fraud.

Accordingly, in the decisioning of step 212, if NO, i.e., the transaction is not a request for withdrawal from an ATM, the process passes to step 214. In step 214, the transaction data is output for non-withdrawal type processing. For example, the transaction might be a deposit with no cash received, a balance inquiry, or a transfer of funds between different accounts.

On the other hand, if the transaction is determined to be a withdrawal from an ATM (YES in step 212) than the process passes to step 216. In step 216, the transaction type filter performs further processing to update relevant databases. In accordance with one embodiment of the invention, the transaction type filter updates profiles including the card static profile and the card dynamic profile. The card static profile is updated to include particulars of the transaction including date of transaction, type of transaction, amount of withdrawal, and biometrics of the customer, for example. The card dynamic profile is updated with the amount of the withdrawal, for example. Further, the ATM static profile is updated to include particulars of the transaction including the date of the transaction, the time of the transaction, the amount of the transaction, and biometrics of the customer who effected the transaction at the physical ATM, for example. It is of course appreciated that other attributes of the ATM, transaction and/or the customer may be communicated to and updated in the database portion 120.

After step 216 of FIG. 8, the process passes to step 218. In step 218, the process returns to step 220 of FIG. 7.

Figure 9:
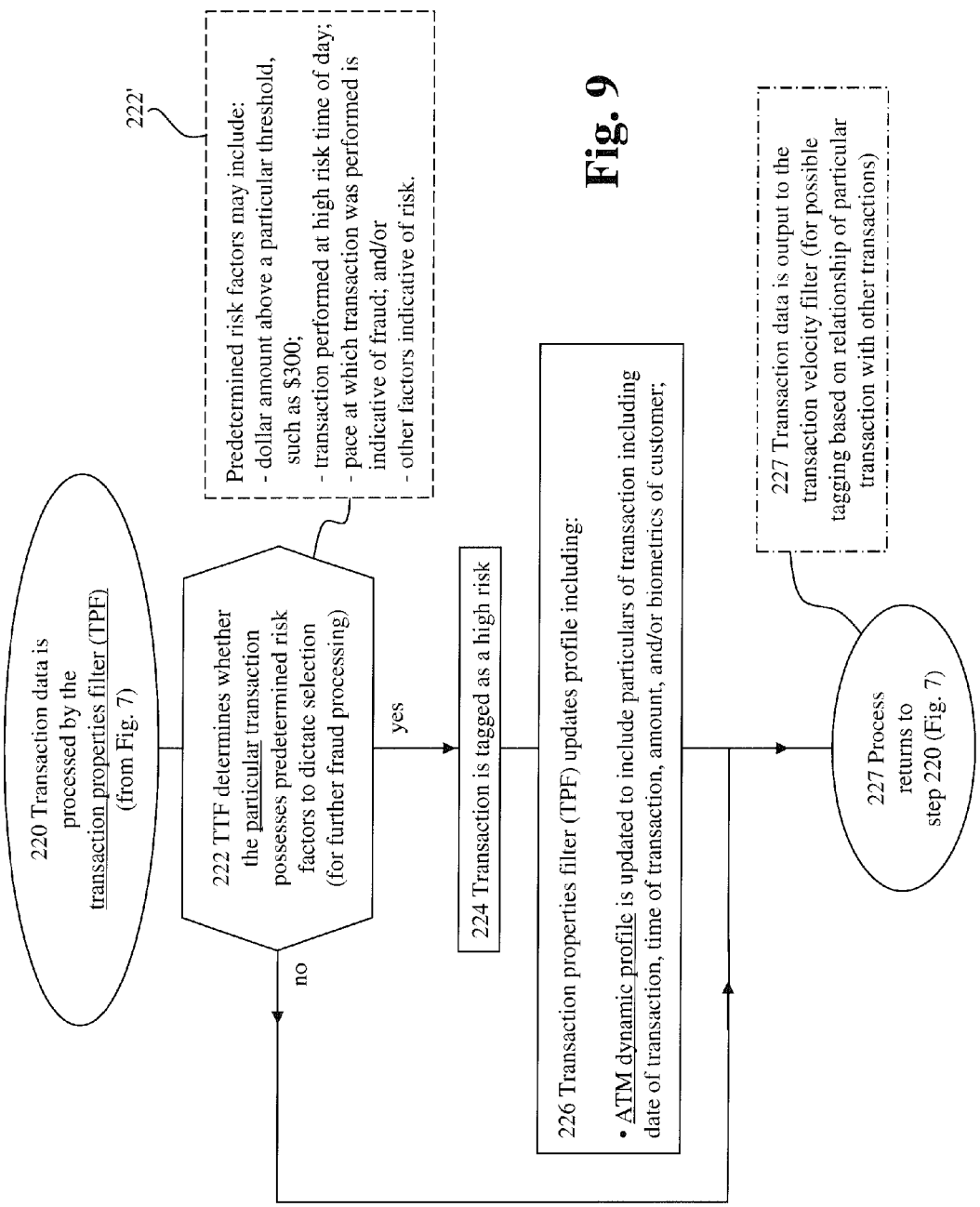
FIG. 9 is a flowchart showing further details of FIG. 7 in which the transaction data is processed by the transaction properties filter in accordance with one embodiment of the invention.

FIG. 9 is a flowchart showing further details of step 220 (FIG. 7) in which the transaction data is processed by the transaction properties filter in accordance with one embodiment of the invention. As shown, the sub-process of FIG. 9 starts in step 220 and passes to step 222. In step 222, the transaction properties filter (TPF) determines whether the particular transaction possesses predetermined risk factors to dictate selection for further processing, i.e., so as to warrant further processing to detect possible fraud. The processing of step 222 may utilize decisioning regarding any of a variety of predetermined risk factors. For example, such predetermined risk factors may include the dollar amount of a particular threshold. For example, any ATM withdrawals above $300 may be selected in step 222. Other risk factors might include that the transaction was performed at a high risk time of the day, the pace at which the transaction was performed as indicative of fraud, and/or other observed attributes that are indicative of fraud. Further, it is of course appreciated that such predetermined risk factors are not necessarily viewed individually. Rather, the risk factors may be analyzed by the transaction properties filter in some collective manner. For example, in a particularly high risk time of day, the dollar amount threshold may decrease so as to warrant further analysis and review for possible fraud.

As shown in FIG. 9, if the processing of step 222 determines that the transaction does not possess predetermined risk factors to dictate selection for further fraud processing, i.e., NO in step 222, then the process passes to step 227. On the other hand, if YES in step 222, then the process passes to step 224. In step 224, the transaction is tagged as a high risk transaction. Then, the process passes to step 226. In step 226, the transaction properties filter updates profile information in the database portion 120. Specifically, the transaction properties filter updates the ATM dynamic profile to include particulars of the transaction including date of transaction, time of transaction, amount, and/or biometrics of the user effecting the transaction, for example. In accordance with one aspect of the invention, it is appreciated that the analysis of the particulars of the transaction (as performed by the system) may be interrelated. Illustratively, analysis of transaction timing data may be performed differently if biometric data is available vis-à-vis the situation in which biometric data is not available. After step 226 of FIG. 9, the process passes to step 227.

In step 227, the process passes to step 220 of FIG. 7. That is, the transaction data is output to the transaction velocity filter for further analysis. In this together, transaction data is analyzed (for possible fraud) based on the relationship of the particular transaction with other transactions.

In accordance with one aspect of the invention, it is appreciated that the processing performed by the system 100 is directed primarily to a determination as to whether a particular transaction will be authorized or declined. In performing such processing, the system may utilize data associated with the particular card, data associated with the particular ATM at which the transaction is being effected, and/or data related to transactions that are somehow related to the current pending transaction. For example, such transactions may be related in that they are proximate in time. Relatedly, it is appreciated that processing may be implemented in which the ATM machine itself is operationally controlled in some manner based on observed transaction data. For example, such operational control might include the ATM being placed into a brief time-out or, in an extreme situation, the ATM being taken out of operation. However, it is appreciated that fraudulent activity generally comprises a small percentage of transactions at any given ATM. As a result, it may well be desirable to perform decisioning as to whether to approve or decline a particular transaction, i.e., as opposed to effecting any adverse operational measures as to the ATM itself.

Figure 10:
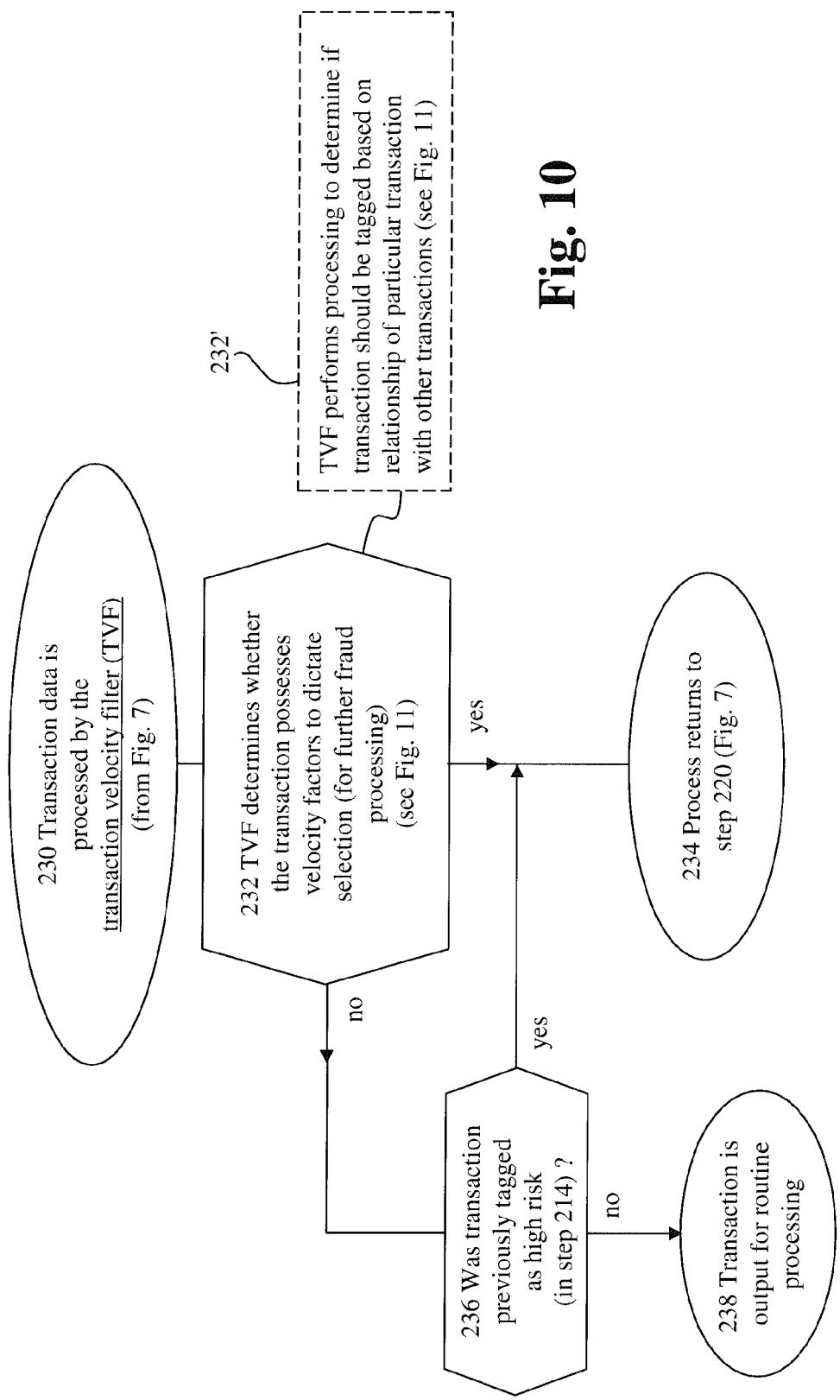
FIG. 10 is a flowchart showing further details of FIG. 7 in which the transaction data is processed by the transaction velocity filter, in accordance with one embodiment of the invention.

FIG. 10 is a flowchart showing further details of step 230 (FIG. 7) in which the transaction data is processed by the transaction velocity filter, in accordance with one embodiment of the invention. That is, FIG. 10 shows further details of step 230 of FIG. 7. As shown, the process starts in step 230 in passes to step 232. In step 232, the transaction velocity filter determines whether the transaction possesses velocity factors to dictate selection by the filter. In other words, the transaction velocity filter determines if there are velocity, e.g. pace, related attributes to the transaction that would dictate further processing to identify possible fraud. Further details of the processing of step 232 are described below with reference to FIG. 11. If NO in step 232 of FIG. 10, the process passes to step 236. In step 236, decisioning is made as to whether the particular transaction was previously tagged as high risk, i.e., was the transaction tagged as high risk in step 214. If NO, then the process passes to step 238. In step 238, the transaction is output for routine processing since the attributes of the transaction do not suggest fraud. On the other hand, if YES in step 236, then the process passes to step 234 of FIG. 10.

Also, if YES in step 232 (i.e. the transaction does possess velocity factors to dictate possible fraud) the process passes to step 234. In step 234, process returns to step 220 of FIG. 7.

Figure 11:
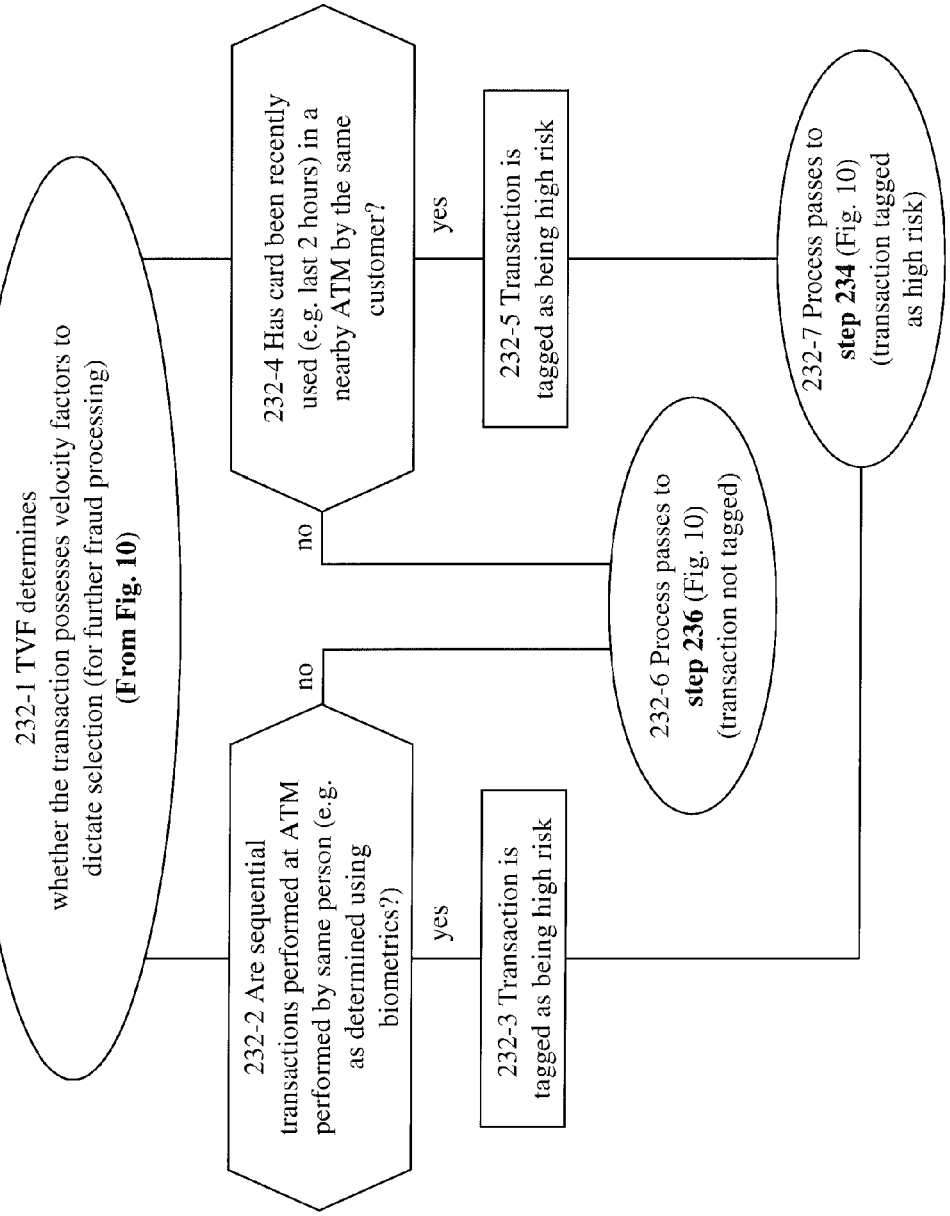
FIG. 11 is a flowchart showing in further detail the processing FIG. 10, in accordance with one embodiment of the invention.

FIG. 11 is a flowchart showing in further detail the processing of step 232 of FIG. 10, in accordance with one embodiment of the invention. As shown, the process starts in step 232-1 in which the transaction velocity filter determines whether the transaction possesses velocity factors to dictate selection of that particular transaction for further fraud processing. As depicted in FIG. 11, parallel processing of steps 232-2 and 232-4 are performed by the transaction velocity filter 116. In step 232-2 the transaction velocity filter determines whether there are sequential transactions performed at the ATM, which are performed by the same person, i.e., the same physical person. For example, such sequential transactions performed by the same customer may utilize biometrics information of the customer. For example, a customer might be identified by facial recognition. The transaction velocity filter may identify that such person indeed effected multiple sequential transactions with different cards associated respectively with different names. Accordingly, the decisioning of step 232-2 would render a YES. As a result, the processing would pass to step 232-3, and the transaction would be tagged as being high risk.

It is appreciated that a particular ATM may not be adapted to perform the processing of step 232-2—in that such ATM may not be provided with biometric recognition capability. In such situation, it is appreciated that other parameters might be utilized to identify fraudulent activity. For example, timing parameters might be utilized. Illustratively, a typical modus operandi for a fraudster is to make a sequence of quick cash withdrawals from an ATM, using a respective fraudulently obtained card for each withdrawal. Relatedly, it is common for a fraudster to withdraw the maximum amount in each transaction. Accordingly, the processing may be adapted to monitor and identify such activity, i.e., by identifying a quick succession of withdrawals in which the maximum amount is withdrawn. In accordance with a further embodiment, such processing of timing related data may be performed in conjunction with biometric analysis, as described above with reference to step 232-2.

In parallel to the processing of step 232-2 of FIG. 11, the processing also includes step 232-4. In the parallel processing of step 232-4, the transaction velocity filter performs decisioning to determine whether the particular card has recently been used in a nearby ATM by the same customer. The particular time window may very depending on the particular circumstances and other criteria. For example, use of the same card at a different ATM locations within an 8 hour window may be identified in the processing of step 232-4 as indicative of fraud. Accordingly, the processing would pass to step 232-5 in which the transaction is tagged as being high risk. After either of step 232-3 or step 232-5, the processing passes to step 232-7. Therein, the process passes to step 234 of FIG. 10. That is, the transaction is tagged as high risk.

On the other hand, if NO in both of steps 232-2 and step 232-4, then the process passes to step 232-6 in which the process passes to step 236 of FIG. 10. That is, the transaction is not tagged as being high risk.

Figure 12:
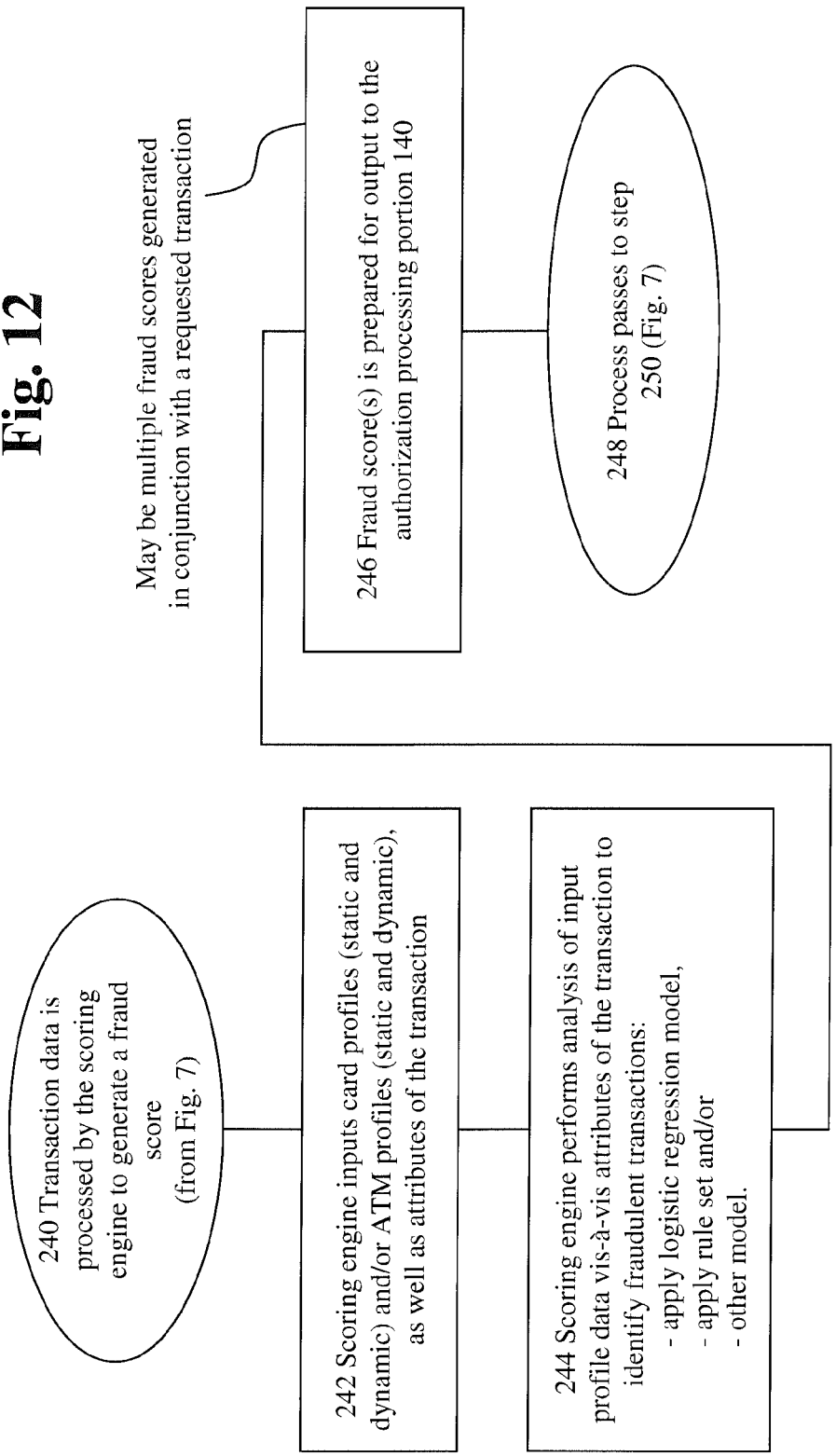
FIG. 12 is a flow chart showing in further detail the processing of FIG. 7 in which the transaction data is processed by the scoring engine to generate a fraud score, in accordance with one embodiment of the invention.

It is appreciated that the processing of a transaction may include the transaction being tagged in various manners. Such tagging may trigger particular processing at some later time by the transaction risk processing system 100. For example, in the flowcharts of FIGS. 9 and 11, transactions are tagged as being high risk based on various respective criteria. The transaction tagged is being high risk in step 224 of FIG. 9 might be tagged in a different manner vis-à-vis the tagging of step 232-3 or step 232-5 of FIG. 11. Further, processing and decisioning may be provided such that a single tag by one of such steps does not trigger further fraud related processing, whereas multiple tags associated with a particular transaction will trigger fraud related processing. Also, it is appreciated that the system may be provided to perform certain fraud related processing if one type of tag is identified, and other fraud related processing if another type of tag is identified. Relatedly, it is appreciated that a wide variety of attributes and/or metrics of either the transaction and/or the ATM may be utilized in the processing of FIGS. 7-11, in particular, FIG. 12 is a flow chart showing in further detail step 240 of FIG. 7 in which the transaction data is processed by the scoring engine to generate a fraud score, in accordance with one embodiment of the invention. As shown, the process starts in step 240 and passes to step 242. In step 242, the scoring engine analyzes card profiles, both static and dynamic, as well as ATM profiles, both static and dynamic. It is appreciated that such analysis of card profile information may utilize logistic regression modeling techniques or some other modeling technique. In general, the analysis performed by the scoring engine establishes certain relationships of information and/or patterns that are indicative of fraud. The scoring engine then compares these known relationships with the particulars of the transaction or transactions under consideration. If the particular transaction under consideration correlates to such relationships of information and/or patterns that are indicative of fraud, then the transaction under consideration is tagged as high risk. Accordingly, the transaction under consideration is further processed to determine whether the transaction is legitimate or fraudulent.

Figure 13:
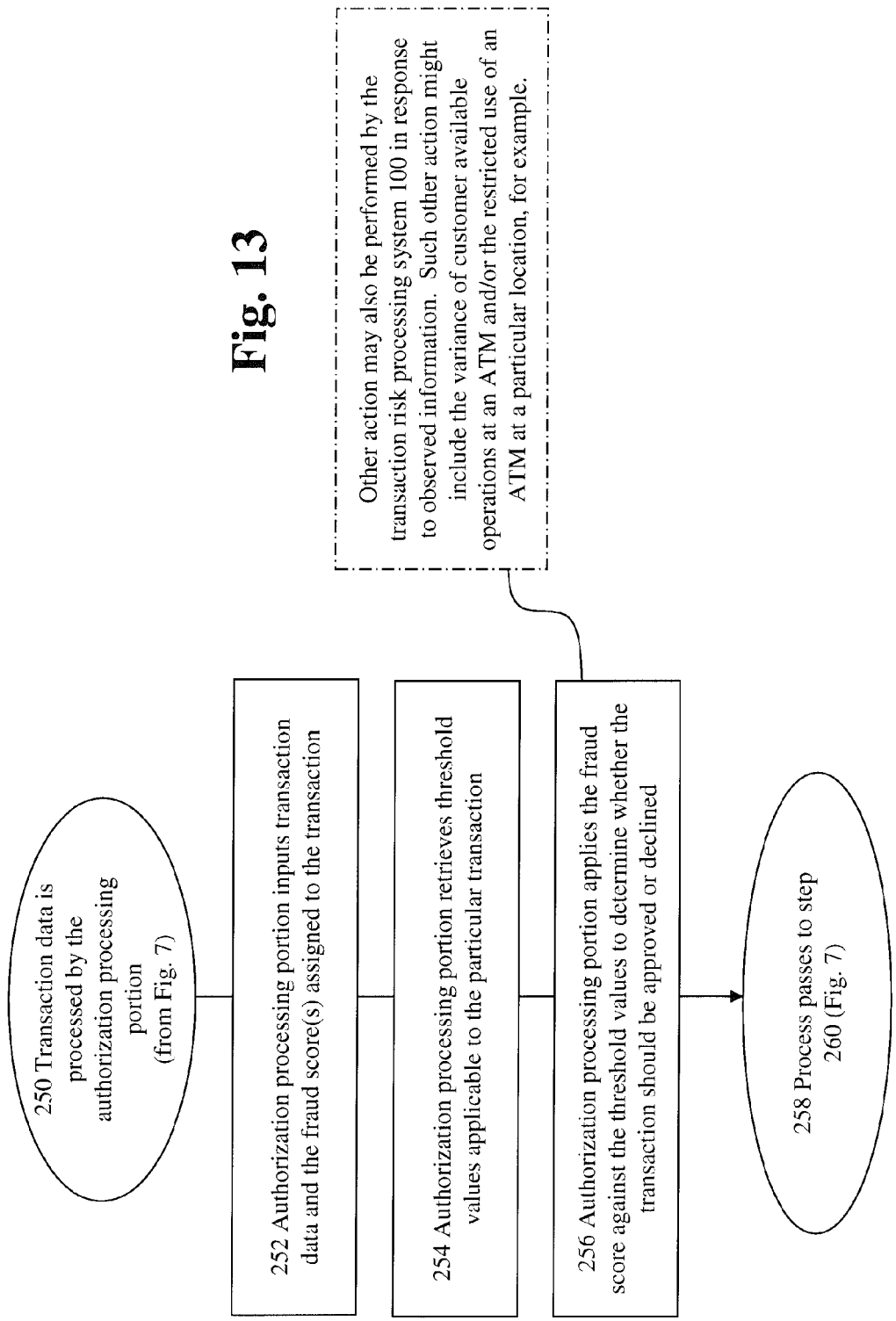
FIG. 13 is a flowchart showing in further detail the processing of FIG. 7 in which the transaction data is processed by the authorization processing portion, in accordance with one embodiment of the invention.

FIG. 13 is a flowchart showing in further detail the processing of step 250 of FIG. 7 in which the transaction data is processed by the authorization processing portion, in accordance with one embodiment of the invention. As shown, the process starts in step 250 and passes to step 252. In step 252, the authorization processing portion inputs transaction data and at least one fraud score assigned to the transaction. Then, in step 254, the authorization processing portion retrieves threshold values applicable to the particular transaction. Then, the process passes to step 256.

In step 256, the authorization processing portion applies the fraud score against the threshold values to determine whether the transaction should be approved or declined. It is appreciated that other action may also be performed by the transaction risk processing system 100 in response to observed information. That is, other action in addition to a determination of whether the particular transaction should be approved or declined. For example, such further action might include the variance of customer available options at an ATM and/or the restricted use of an ATM (at a particular location) by all customers.

In FIG. 13, after step 256, the process passes to step 258. In step 258, the process returns to FIG. 7 and step 260. Subsequent processing is described above.

In general, the systems and methods of the invention provide a technique and methodology to parse out fraudulent transactions from legitimate transactions with a reasonable degree of confidence. Such capability becomes important in the situation of a large financial institution dealing with millions of customers, performing millions of legitimate transactions each day. In general, it is appreciated that fraudulent transactions are a relatively small percentage in the volume of transactions processed. Accordingly, the invention provides to parse out fraudulent transactions for further analysis using a novel technique. Accordingly, the invention further provides a framework which allows a financial institution sufficient confidence in real time to decline a transaction which looks fraudulent, without affecting too many good customers at the same time.

As described above, the tool of the invention incorporates not only a customer's profile and card profile, but also incorporates the ATM machine profile. Accordingly, the invention allows for determination of whether the ATM machine is itself at risk, e.g., based on an observation made by the system that the activity and the usage pattern of the machine is no longer normal for that particular machine.

As described herein, in one embodiment of the invention, the scoring engine may utilize a rules-based approach. In accordance with one simplistic embodiment, such rules-based approach sets out that if a transaction, card, customer and/or ATM meets criteria A, B and C, then the rule is triggered and predetermined action is taken. For example, such predetermined action may include declining the requested transaction. In other embodiments, the invention may use a particular model approach, such as logistic regression modeling. Relatedly, it is appreciated that the processing may include assigning a probability score, i.e., a confidence score in conjunction with processing a particular transaction. Such confidence score may be applied so as to prioritize transactions under consideration. A transaction with a high confidence score, i.e. a high probability that the transaction is indeed fraudulent, will receive a high priority. This allows a transaction having a high confidence score to be analyzed first. More specifically, such allows a transaction with a high confidence score to go to the top of the list for processing by a available system resources and/or go to the top of the list for output to a human administrator for review. Accordingly, the probability score can be used to assess risk, assign a weighting, and prioritize either system workload and/or human workload. Further, prioritization allows a determination of the particular score level at which the system should decline the requested transaction versus approving the requested transaction.

It is appreciated that the fraud related processing as described herein may be used in conjunction with various other techniques to ascertain whether a requested transaction is fraudulent. For example, the transaction risk processing system 100 may include functionality to contact a customer via a second channel if the fraud score is above a certain threshold level, but not high enough to warrant an immediate decline of the transaction. For example, the customer might be contacted in an automated manner via cell phone. A particular communication might be output to the customer requesting a particular responsive communication back to the financial entity. If such communication back is received by the financial entity, then the financial entity can be relatively confident that indeed the legitimate customer was contacted and responded. Authentication confirmation is not limited to phone interaction with the customer. Rather, authentication can be performed via any suitable communication channel. Such provides the system the capability to interact with the customer at the ATM machine, convey to the customer that her requested transaction is identified as a high risk transaction, and (as a result) ask her to confirm that she desires such transaction and that such transaction is indeed legitimate.

Other mechanisms may be utilized to confirm that the ATM is interfacing with a legitimate customer. For example, the customer might be requested to enter further information into the ATM such as her address information—such as the customer's ZIP code. Other information personal to the customer might be presented as a secondary form of authentication. In general, it is appreciated that the systems and methods of the invention may provide a score driven methodology in which the score is based off of multiple variables in the flow of information. Such score driven methodology may be combined with additional lines of communication to the customer.

Is appreciated that the invention is not limited to withdrawals at an ATM. Rather, the invention may be applied in any environment in which there are multiple observable parameters which may be analyzed to predict fraud. Accordingly, instead of the processing described above in association with an ATM withdrawal, the invention may be applied in a point-of-sale (POS) environment. That is, in lieu of an ATM profile, the system may generate and utilize the point-of-sale profile. Such point-of-sale profile might include such information as patterns of sale, the amount of sales, the pace of sales, the type of customer effecting sales, the time of day that fraudulent sales has historically been observed, or other parameters related to fraudulent activity—that may be observed and profiled at the point-of-sale.

Such parameters would be used in conjunction with profiles and parameters of the cards and customers effecting sales at the particular point-of-sale or at related points-of-sale. Point-of-sales may be related based on geographical proximity, time of transaction, nature of goods or services rendered, or based on some other relationship between point-of-sales.

Illustratively, is a situation where a person walks into a WALMART with credit cards from a completely different city and state, and that customer immediately starts taking out multiple thousand dollars transactions buying gift cards. The functionality of the invention may compare such activity with prior activity. Based on the fundamental variation between such observed activity vis-à-vis legitimate activity historically observed with the particular credit card, the system 100 may perform decisioning so as to decline the transaction.

It is appreciated that there are various time periods, thresholds, maximums, minimums, and other parameters illustratively set forth in the descriptions herein. It is of course appreciated that such parameters are for purposes of illustration and not limiting as to the scope of the systems and methods of invention. Rather, it is appreciated that the variance of such parameters will depend on the particular operating environment and/or the particular fraudulent activity targeted, as well as other factors.

Hereinafter aspects of implementation will be described.

As described above, embodiments of the system of the invention and various processes of embodiments are described. The system of the invention or portions of the system of the invention may be in the form of a "processing machine," i.e. a tangibly embodied machine, such as a general purpose computer or a special purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as any of the processing as described herein. Such a set of instructions for performing a particular task may be characterized as a program, software program, or simply software.

As noted above, the processing machine, which may be constituted, for example, by the particular system and/or systems described above, executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize (or be in the form of) any of a wide variety of other technologies including a special purpose computer, a computer system including a microcomputer, mini-computer or mainframe for example, a programmed microprocessor, a micro-controller, a peripheral integrated circuit element, a CSIC (Consumer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform. It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example. As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications and equivalent arrangements.

What is claimed is:

1. A system for identifying fraud in an automated teller machine (ATM) transaction, the system tangibly embodied in the form of a computer processer, the system comprising:
   a plurality of ATMs in a network;
   a profile database that contains both:
      card profiles in a card profile database; and
      ATM profiles in an ATM profile database; and
   a filter processing portion, constituted by a non-transitory computer readable medium of the computer processor, that receives electronically and over the network input transaction data generated from a requested ATM transaction by a customer conducted at one of the plurality of ATMs, the filter processing portion including a plurality of filters that filter high risk transactions based on the input transaction data so as to identify that the transaction by the customer is a high risk transaction, and the filter processing portion outputting card related data and ATM related data to the profile database and to a scoring engine, wherein the (a) card related data comprises at least ATM transactions for a particular card associated with the customer, and (b) the ATM related data comprises at least ATM transactions for the ATM, which includes data from a plurality of users of the ATM; and a scoring engine, constituted by a non-transitory computer readable medium of the computer processor, assessing risk of the transaction based on (1) attributes of the transaction, (2) data in at least one card profile, and (3) data in at least one ATM profile for the ATM, and wherein such assessing risk by the scoring engine is further represented by a fraud score generated by the scoring engine utilizing both the card related data and the ATM related data, such ATM related data including data from a plurality of users of the ATM; and an authorization processing portion, constituted by a non-transitory computer readable medium of the computer processor, that determines whether the requested transaction should be approved or declined, the authorization processing portion receiving as input the fraud score from the scoring engine, the authorization processing portion using the fraud score, in conjunction with the transaction data generated from the requested ATM transaction, in its determination of whether the requested transaction should be approved or declined, and controls the ATM to authorize or refuse the requested transaction by outputting the authorization determination to the ATM electronically and over the network.

2. The system of claim 1, the card profile database including each of a card profile static database and a card profile dynamic database.

3. The system of claim 2, the ATM profile database including each of an ATM profile static database and an ATM profile dynamic database.

4. The system of claim 1, the ATM profile database including each of an ATM profile static database and an ATM profile dynamic database.

5. The system of claim 1, the filter processing portion including at least one of a transaction type filter, a transaction properties filter, and a transaction velocity filter.

6. The system of claim 5, the filter processing portion including a transaction type filter that filters transactions based on type of transaction.

7. The system of claim 6, the transaction type filter performing a filtering so as to select ATM withdrawal transactions.

8. The system of claim 5, the filter processing portion including a transaction properties filter that filters transactions based on properties of those transactions.

9. The system of claim 8, the transaction properties filter filtering transactions based on the dollar amount of those transactions.

10. The system of claim 5, the filter processing portion including a transaction velocity filter that filters transactions based on the pace of a transaction in conjunction with other transactions.

11. The system of claim 1, the profile database receiving updates from a plurality of performed transactions in real time.

12. The system of claim 1, the profile database receiving updates from a plurality of performed transactions over a period of time.

13. A method for identifying fraud in an automated teller machine (ATM) transaction, the method performed by a tangibly embodied computer processer, the method comprising:

providing a profile database that contains both:
card profiles in a card profile database; and
ATM profiles in an ATM profile database; and receiving, over a communication network, transaction data generated from a requested ATM transaction conducted by a customer from one of a plurality of ATMs in the network;

performing, by the computer processor, filter processing including filtering high risk transactions based on the input transaction data so as to identify that the transaction by the customer is a high risk transaction, and the filter processing including outputting (a) card related data and (b) ATM related data to the profile database and to a scoring engine, wherein (a) the card related data comprises at least ATM transactions for a particular card associated with the customer, and further wherein (b) the ATM related data comprises at least ATM transactions for the ATM, which includes data from a plurality of users of the ATM; and assessing risk, by a scoring engine constituted by a non-transitory computer readable medium of the computer processor, of the high risk transaction based on attributes of the transaction, data in at least one card profile, and data in at least one ATM profile for the ATM, and assessing risk by the scoring engine is further represented by a fraud score generated by the scoring engine utilizing both the card related data and the ATM related data, such ATM related data including data from a plurality of users of the ATM; and determining, by an authorization processing portion constituted by a non-transitory computer readable medium of the computer processor, whether the requested transaction should be approved or declined, the determining including:
receiving as input the fraud score from the scoring engine,
using the fraud score, in conjunction with the transaction data generated from the requested ATM transaction, to determine whether the requested transaction should be approved or declined; and
controlling the ATM to authorize or refuse the requested transaction by outputting the authorization decision to the ATM electronically and over the network.

14. The method of claim 13, the card profile database including each of a card profile static database and a card profile dynamic database, and the ATM profile database including each of an ATM profile static database and an ATM profile dynamic database.

15. The method of claim 13, the filter processing including at least one of:
performing transaction type filtering,
performing transaction properties filtering, and
performing transaction velocity filtering.

16. The method of claim 15, the transaction properties filtering performed based on the dollar amount of those transactions.

17. The method of claim 15, the transaction velocity filtering performing filtering based on the pace of a transaction in conjunction with other transactions.

18. A non-transitory computer readable medium, upon which instructions are disposed, that identifies fraud in an automated teller machine (ATM) transaction, the computer readable medium tangibly embodied in the form of a computer processer, the computer readable medium comprising instructions which when executed by the computer processor causes the processor to perform:

provide a profile database that contains both: card profiles in a card profile database; and ATM profiles in an ATM profile database; and performing filter processing that receives electronically and over a network input transaction data generated from a requested ATM transaction by a customer, the filter processing including a plurality of filters that filter high risk transactions based on the input transaction data so as to identify that the transaction by the customer is a high risk transaction, and outputting card related data and ATM related data to the profile database and to be received as input for assessing risk, wherein the card related data comprises at least ATM transactions for a particular card associated with the particular user, and further wherein the ATM related data comprises at least ATM transactions for a particular ATM, which includes data from a plurality of users of the ATM, and the ATM transactions for the particular ATM includes transaction data collected, by the processor, from transactions between the particular ATM and a plurality of customers with associated financial accounts, such transaction data being collected based on association of the transactions to the particular ATM; and assessing risk of the high risk transaction based on attributes of the transaction, data in at least one card profile, and data in at least one ATM profile, and wherein assessing risk is further represented by a fraud score generated utilizing both the card related data and the ATM related data, such ATM related data including data from a plurality of users of the ATM; and determining whether the requested transaction should be approved or declined, the determining including:

receiving as input the fraud score and using the fraud score, in conjunction with the transaction data generated from the requested ATM transaction, to determine whether the requested transaction should be approved or declined; and controlling the ATM to authorize or refuse the requested transaction by outputting the authorization decision to the ATM electronically and over the network.

* * * * *